United States Patent Office 3,010,837
Patented Nov. 28, 1961

3,010,837
REFRACTORY FURNACE AND LADLE
LINING MATERIALS
Donald M. Rice, Wellston, Ohio, assignor to Sivad Ceramic Corporation, Oak Hill, Ohio, a corporation of Ohio
No Drawing. Filed Apr. 11, 1960, Ser. No. 21,107
3 Claims. (Cl. 106—56)

This invention is a continuation-in-part of my application serially numbered 589,364, filed June 5, 1956, now abandoned, and relates to new and useful improvements in refractory furnace and ladle lining materials and it is among the objects thereof to provide a refractory lining for mixing with water to be used either for ramming around furnace slag and tapping holes or the like, or for use in the shape of plastic bricks in building furnace and ladle linings, and it is among the objects of the invention to provide a refractory lining material that is extremely resistant to molten metal, oxides and slags to assure greater ladle and furnace life.

It is a further object of the invention to provide a refractory lining that prevents iron and slag from sticking and wetting the surface of the refractory material.

It is well known that carbon is highly refractory and prevents sticking of iron and slag when carbon is used in a refractory lining or brick mixture. Carbon, however, oxidizes rapidly at temperatures around 2000° F. and if the carbon is mixed with flint clay, silica and bonding clay to be used as a lining or as a refractory brick, the carbon would be oxidized throughout the entire thickness of the lining or brick and the lining would thereby lose its ability to prevent the sticking of the iron and slag with which it comes in contact in furnace or ladle operations.

In accordance with the present invention, I provide a refractory lining material of a substantial carbon content, along with calcined minerals and clays in which powdered glass of a very fine mesh is included to the degree that it forms a protective coating on the surface of the lining material that is exposed to the iron and slag of a furnace or ladle, to prevent oxidation of the carbon while maintaining its effectiveness for preventing iron and slag from sticking and wetting the refractory surface, which should result in speedy deterioration of the refractory material.

I have discovered that by using a powdered glass of a fine mesh of a melting composition that will melt at 1500° F. and a proper mixture of calcined flint, silica, graphite and the proper bond clays and an organic binder such as dextrine, the mixture can be wetted to a ramming consistency or it may be produced as a plastic brick, which when built in a cupola wall, or rammed into slag spouts or burner ports, will maintain the effectiveness of the carbon after the glass has fused into a protective surface coating on the wall of the lining that is exposed to the metal or slag.

By way of example, a suitable composition of the refractory material including carbon and glass is as follows.

| Mesh: | Percentage by weight |
|---|---|
| Minus 8 calcined flint | 30–40 |
| Minus 6+20 silica or quartzite | 15–25 |
| Kentucky ball clay, air floated | 15–25 |
| Minus 30 graphite | 15–25 |
| Minus 80 powdered glass of a composition that will melt at 1500° F | 1–8 |
| Minus 100 powdered silica to which is added 1 to 3% organic binder such as dextrine | 1–8 |

These ingredients are thoroughly mixed in dry form and the mix is ready for use by the addition of water in amounts running from 6 to 10%.

The mixture may be utilized in the form of a plastic brick produced by working the material in a pugging machine wherein water is added and the mix is de-aired to render it dense and compact. In the plastic brick form, it may be laid up like brick to line foundry ladles, or it may be used for furnace spouts and many other uses.

I have found that a suitable low melting temperature glass that will melt at 1500° F. when used as the powdered glass of the mix, may be produced from the following analysis:

| | |
|---|---|
| Silica | 71.5 |
| Aluminum oxide | 1.65 |
| Calcium oxide | 7.10 |
| Magnesium oxide | 2.70 |
| Barium oxide | .29 |
| Sodium oxide | 14.38 |
| Potassium oxide | .77 |
| Boron oxide | .10 |
| Sulphur trioxide | .20 |
| Iron oxide | .03 |
| Lead oxide | 1.33 |
| Zinc oxide | Trace |
| Manganese oxide | Trace |
| Chrome oxide | Trace |

This glass, when running from a melting furnace, may be captured as cullet and ground to an 80 mesh, or it may be produced from broken glassware of the above, or similar, analysis.

The preferred proportions of the composition, which is in percentage by weight, is as follows.

| Mesh: | Percentage by weight |
|---|---|
| Minus 8 calcined flint | 37 |
| Minus 6 plus 20 silica or quartzite | 24 |
| Kentucky ball clay, air floated | 17 |
| Minus 30 graphite | 17 |
| Minus 80 powdered glass | 4 |
| Minus 100 powdered silica to which is added 1% organic binder such as dextrine | 1 |

I have found that 4% by weight, of the powdered glass, is sufficient to react with the fine raw silica and bond clay to form a skin on the exposed surface of the refractory lining to prevent oxidation of carbon at 2000° and not be too fluid to wash at 2800°. The fusion point of the lining composition, as given, is approximately 2950°. Less than 4% glass may be used, but the amount is dependent upon the amount of fluxes present in the remainder of the raw materials so as to assure uniform and thorough coating of the refractory with the glass or vitrous skin. The amount of glass formed on the surface at 2800° F., together with the viscosity of said glass, is vitally important to the service results. While more than 4% glass may be used, it would not enhance the effectiveness and if used in excess of 8%, it would result in a fluid glass surface that is washed by the moving metal to expose the carbon to oxidation.

Another composition which increases the service temperature of the mix and also gives the material a permanent thermal expansion as does the silica to prevent cracks, which makes the composition a superduty carbon plastic, consists of the preceding formula to which is added 100 mesh raw kyanite of 20% by weight. In that composition, the silica or kyanite is entirely eliminated. In comparison with the regular formula above, the composition would be as follows:

|  | Regular | Super Duty |
|---|---|---|
| 8 Mesh Calcined Flint | 35 | 39 |
| −6 Mesh+20 Mesh Silica | 24 |  |
| Ball Clay, Air Floated | 17 | 17 |
| 30 Mesh Graphite | 17 | 17 |
| 80 Mesh Powdered Glass | 4 | 4 |
| 100 Mesh Powdered Silica | 1 | 1 |
| Dextrine | 2 | 2 |
| 100 Mesh Raw Kyanite |  | 20 |

While I have specified dextrine as the organic binder suitable for the composition, any other organic binder could be substituted for the dextrine in the proportion required. Also, while I have specified a particular composition of a low melting glass, other proportions of the ingredients specified may produce a glass of a sufficiently low melting temperature to be useful in the refractory composition.

If the grain sizing in the refractory composition is too coarse, the glass loses its effectiveness in its inability to properly seal the surface and more oxidation of the carbon inside of the lining would result. A coarse silica is used because of its tendency to expand under heat, thereby counteracting the tendency of shrinkage of the other ingredients.

Although one embodiment of the invention has been herein illustrated and described, it will be evident to those skilled in the art that various modifications may be made in the proportions and ingredients of the compositions without departing from the principles herein set forth.

I claim:

1. A composition for applying a refractory lining for molten metals and slag which consists of:

|  | Percent |
|---|---|
| 8 mesh calcined flint | 30 to 40 |
| Minus 6 mesh plus 20 mesh silica | 15 to 25 |
| Ball clay, air floated | 15 to 25 |
| 30 mesh graphite | 15 to 25 |
| 80 mesh powdered glass of a composition that will melt at 1500° F. | 1 to 8 |
| 100 mesh powdered silica | 1 to 8 |
| Dextrine | 1 to 3 | in which the powdered glass is produced from the following analysis:

| | |
|---|---|
| Silica | 71.5 |
| Aluminum oxide | 1.65 |
| Calcium oxide | 7.10 |
| Magnesium oxide | 2.70 |
| Barium oxide | .29 |
| Sodium oxide | 14.38 |
| Potassium oxide | .77 |
| Boron oxide | .10 |
| Sulphur trioxide | .20 |
| Iron oxide | .03 |
| Lead | 1.33 |
| Zinc oxide | Trace |
| Manganese oxide | Trace |
| Chrome oxide | Trace |

2. A composition for applying a refractory lining for molten metals and slag which consists of:

|  | Percent |
|---|---|
| 8 mesh calcined flint | 35 |
| Minus 6 mesh plus 20 mesh silica | 24 |
| Ball clay, air floated | 17 |
| 30 mesh graphite | 17 |
| 80 mesh powdered glass of a composition that will melt at 1500° F. | 4 |
| 100 mesh powdered silica | 1 |
| Dextrine | 2 | in which the powdered glass is produced from the following analysis:

| | |
|---|---|
| Silica | 71.5 |
| Aluminum oxide | 1.65 |
| Calcium oxide | 7.10 |
| Magnesium oxide | 2.70 |
| Barium oxide | .29 |
| Sodium oxide | 14.38 |
| Potassium oxide | .77 |
| Boron oxide | .10 |
| Sulphur trioxide | .20 |
| Iron oxide | .03 |
| Lead | 1.33 |
| Zinc oxide | Trace |
| Manganese oxide | Trace |
| Chrome oxide | Trace |

3. A composition for applying a refractory lining for molten metals and slag which consists of:

|  | Percent |
|---|---|
| 8 mesh calcined flint | 39 |
| Ball clay, air floated | 17 |
| 30 mesh graphite | 17 |
| 80 mesh powdered glass of a composition that will melt at 1500° F. | 4 |
| 100 mesh powdered silica | 1 |
| Dextrine | 2 |
| 100 mesh raw kyanite | 20 | in which the powdered glass is produced from the following analysis:

| | |
|---|---|
| Silica | 71.5 |
| Aluminum oxide | 1.65 |
| Calcium oxide | 7.10 |
| Magnesium oxide | 2.70 |
| Barium oxide | .29 |
| Sodium oxide | 14.38 |
| Potassium oxide | .77 |
| Boron oxide | .10 |
| Sulphur trioxide | .20 |
| Iron oxide | .03 |
| Lead | 1.33 |
| Zinc oxide | Trace |
| Manganese oxide | Trace |
| Chrome oxide | Trace |

References Cited in the file of this patent

UNITED STATES PATENTS

| 2,422,215 | Amberg et al. | June 17, 1947 |
| 2,684,913 | West | July 27, 1954 |
| 2,772,176 | Leitten | Nov. 27, 1956 |